United States Patent [19]

Bowser

[11] 4,092,290
[45] May 30, 1978

[54] IN SITU CURABLE SEALANT AND METHODS FOR MAKING AND USING SAME

[75] Inventor: George H. Bowser, New Kensington, Pa.

[73] Assignee: PPG Industries, Inc., Pittsburgh, Pa.

[21] Appl. No.: 582,494

[22] Filed: May 30, 1975

Related U.S. Application Data

[60] Continuation of Ser. No. 371,913, Jun. 20, 1973 abandoned, which is a continuation-in-part of Ser. No. 190,864, Oct. 20, 1971, abandoned, which is a division of Ser. No. 49,779, Jun. 25, 1970, abandoned.

[51] Int. Cl.$^2$ ............................................. C08L 23/22
[52] U.S. Cl. ................................. 260/42.36; 260/889
[58] Field of Search ................ 260/33.6 A, 889, 42.36

[56] References Cited

U.S. PATENT DOCUMENTS

| 2,974,377 | 3/1961 | Kunkle | 260/41.5 R |
|---|---|---|---|
| 3,076,777 | 2/1963 | Zeolla | 260/33.6 R |
| 3,290,165 | 12/1966 | Iannicelli | 260/41.5 A |
| 3,500,603 | 3/1970 | Strack | 260/33.6 AQ |
| 3,654,005 | 4/1972 | Higgins | 260/884 |

FOREIGN PATENT DOCUMENTS 319,566   1/1970   Sweden.

Primary Examiner—Paul R. Michl
Attorney, Agent, or Firm—Donna L. Seidel; E. Kears Pollock

[57] ABSTRACT

A sealant suitable for use with multiple glazed window units is disclosed. The sealant comes in the form of two relatively low viscosity components, each of which has an unlimited storage life. When it is desired to apply the sealant, the components are fed to an extruder and blended together to form an initially uncured cold flowable mastic material of relatively low viscosity. Because each of the two components of the sealant composition is of low viscosity and the initially uncured composite of the two components blended together is also of low viscosity, the sealant can be extruded at relatively low temperatures, thus preventing premature rapid curing and insuring that the sealant composition will have a low viscosity and be cold-flowable immediately after extrusion. The sealant is then cured in situ at ambient temperature over a period of several weeks to form a firm, tacky, resilient seal.

24 Claims, 2 Drawing Figures

4,092,290

IN SITU CURABLE SEALANT AND METHODS FOR MAKING AND USING SAME

CROSS REFERENCE TO RELATED APPLICATION

This application is a continuation of application Ser. No. 371,913, filed June 20, 1973, now abandoned, which in turn is a continuation-in-part of application Ser. No. 190,864, filed Oct. 20, 1971, now abandoned, which is a division of application Ser. No. 49,779, filed June 25, 1970, now abandoned.

BACKGROUND OF THE INVENTION

1. Field of the Invention

This invention relates to sealants and more particularly relates to sealants which are useful in glazing applications.

2. Brief Description of the Prior Art

Kunkle in U.S. Pat. No. 2,974,377 discloses a vulcanizable sealant composition suitable for use in multiple glazing applications comprising butyl rubber blended with polyisobutylene or polybutene and cured with para-dinitrobenzene. This is an excellent sealant for use in multiple glazed units providing a hermetic seal. Unfortunately, the sealant composition, even before curing, has an extremely high viscosity or consistency due to the relatively high proportion of butyl rubber in comparison to the polybutene or polyisobutylene. This high viscosity usually requires high milling or extruding temperatures, which activate the curing agent and vulcanize the sealant composition in the mill or extruder. When it is desired to utilize the vulcanized composition for sealing multiple glazed window units, high temperature and pressure equipment such as high temperature, long barrel extruders to extrude the sealant into bead or ribbon form must be used. This type of extrusion equipment is very expensive, usually cannot be afforded by the small window fabricator and cannot be used in the field to extrude the sealant in usable form for glazing multi-pane window units. In addition, after the sealant is extruded into ribbon form, its viscosity or consistency is such that it does not readily cold flow and the sealant must be applied to the multiple glazed window unit with pressure clamps and rigid spacers. These latter disadvantages make field applications impractical and also increase the expense of fabricating for the small manufacturer.

From the above, it is apparent that what is needed is a sealant composition which has a relatively low viscosity so that the components of the sealant can be extruded together at low temperatures without activating the curing agent, thereby providing an uncured low viscosity sealant composition which can be used with low temperature and pressure equipment. The low viscosity sealant composition once applied to the multiple glazed unit should vulcanize while in place preferably at room temperature to form a hermetic seal. This invention provides such a sealant.

SUMMARY OF THE INVENTION

In accordance with this invention, there is provided a room temperature vulcanizable sealant comprising an admixture of two rubbery components. The two components each comprise butyl rubber, polybutene, and polyisobutylene. The first component also includes a quinone dioxime, and the second component includes an oxidizing agent. The two components each have relatively low viscosities or consistencies, and can be extruded together at relatively low temperatures to form an initially uncured cold flowable mastic material in bead or ribbon form. The individual components have unlimited shelf life. Curing only begins when the components are mixed together and the oxidizing agent comes in contact with the quinone dioxime, oxidizing it to the corresponding dinitro compound which cures or vulcanizes the rubbery composition. The extruded sealant composition is initially uncured and of relatively low viscosity, and since the curing is not accelerated as it would be if high temperature extrusion had been employed, as is necessary with high viscosity compositions, the low viscosity sealant composition readily cold flows and can easily be applied to double glazed units without the need for pressurizing equipment such as clamps, rigid spacers and the like. After about 2 to 4 weeks at room temperature, while in situ in the window unit, the sealant composition fully cures in the multiple glazed window unit and forms a firm, resilient hermetic seal.

Pigments, reinforcing agents and fillers such as silica pigments and carbon black can optionally be added to each of the components to get the required flow and consistency to the sealant composition. Other optional ingredients such as adhesion promoting agents, surfactants and tackifiers can also be included in the sealant formulation.

DETAILED DESCRIPTION

Figure 1:
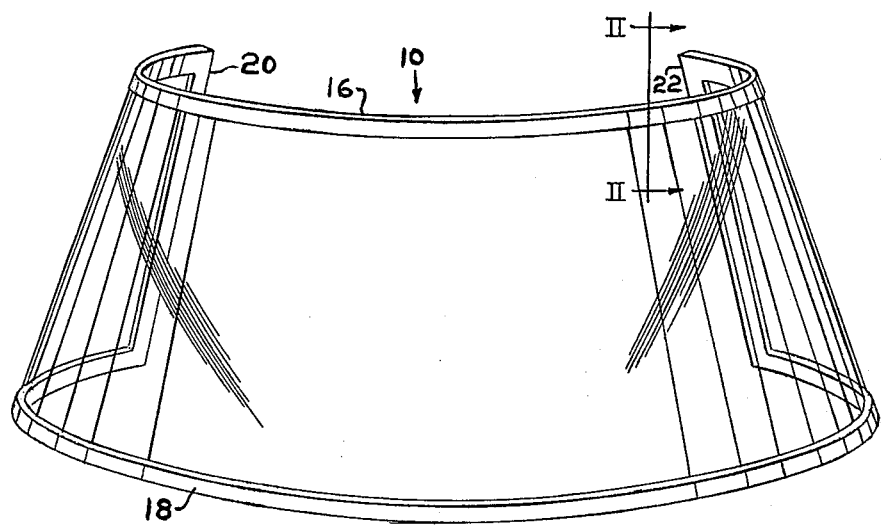
FIG. 1 is a perspective view of a multiple glazed unit employing the sealant of this invention.
Figure 2:
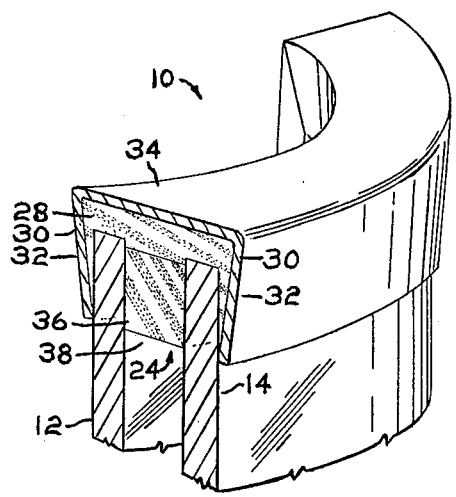
FIG. 2 is a fragmentary view, partially in section, along the line II—II of FIG. 1.

Referring to the drawings, FIGS. 1 and 2 show a pattern or curved multiple glazed unit 10 to which the sealant of the invention is particularly adaptable. The unit 10 comprises two bent sheets of glass 12 and 14 arranged in parallel relationship and spaced from one another to provide an insulating air space between the sheets. As shown, the multiple glazed unit 10 is convex in shape and has a curved upper edge 16, a curved lower edge 13 and straight side edges 20 and 22.

As shown in FIG. 2, the glass sheets 12 and 14 are separated at their marginal edges by a continuous spacer-dehydrator element 24. The spacer-dehydrator element is flexible so that it conforms to the curves and bends of the multiple glazed unit 10. It is composed of a desiccant material 36 such as powered molecular sieve dispersed in an elastomeric material such as styrene-butadiene block copolymer.

A ribbon or layer 28 of the sealant composition of the invention is adhered to the peripheral edge of the spacer 24, the peripheral edges 30 of the glass sheets and marginal edge portions 32 of the outer faces of the glass sheets. The sealant composition 28 extends completely around the perimeter of the unit. A channel member 34 of essentially U cross-section also extends completely around the perimeter of the unit to protect the edges.

The sealant composition 28 comprises a 3-ingredient rubber system of butyl rubber, polybutene and polyisobutylene. The sealant comes in the form of two components which can be stored indefinitely until the intended time of application, at which time the relatively low viscosity components can be extruded or milled together at relatively low temperature to form a cold flowable mastic composition which will fully cure or vulcanize at room temperature in about 2 to 4 weeks. The first component of the sealant composition includes butyl rubber, polybutene, polyisobutylene and quinone dioxime. The second component includes butyl rubber, polybutene, polyisobutylene and an oxidizing agent for the quinone dioxime.

By the term "butyl rubber" is meant a rubber-like polymeric substance produced by the polymerization of an olefin, for example, isobutylene, and a diolefin of the group including butadiene, isoprene, dimethylbutadiene, pentadiene and piperylene. The polymers contain 70 to 99.5 percent by weight of the olefin and 30 to 0.5 percent by weight of the diolefin. The copolymers are produced by low temperature polymerization using a solution of aluminum chloride in a low freezing solvent such as ethyl or methyl chloride at temperatures ranging from $-10°$ to $-100°$ C. or lower. The polymer thereby produced should have a viscosity average molecular weight (Standinger) between 300,000 to 500,000, a Mooney value of about 35 to 75, preferably 40 to 50, and should have about 0.6 to 2.2, preferably about 0.8 to 2.0 mole percent unsaturation.

The butyl rubber contributes resilience and resistance to cold flow to the cured sealant composition. The butyl content should be about 18 to 65 percent, and preferably about 18 to 35 percent by weight of total weight of the cured sealant composition. Butyl contents greater than that recommended result in a sealant composition which is difficult to mill and to extrude and which cannot be easily applied to a multiple glazed unit, having too great a resistance to flow. Lower butyl rubber contents result in a sealant composition which does not cure properly, resulting in insufficient sealing properties.

The polybutene and polyisobutylene when blended with the butyl rubber contribute processing advantages to the sealant system. The polybutene component makes the sealant composition soft and somewhat tacky, permits milling and extrusion at relatively low temperatures and pressures, and permits installation of the extruded sealant to the multiple glazed unit with relatively little pressure.

The polybutene materials useful in the practice of the invention have number average molecular weights of from about 300 to 3000 and the viscosities of the polybutenes range from light oils to extremely viscous liquids, having Saybolt Universal Viscosities from 40 to 20,000 seconds at 210° F. The viscosities increase with increasing molecular weight. The polybutene content should be within the range of 15 to 65 percent, and preferably 15 to 35 percent by weight, based on total weight of the sealant composition. Use of less than the recommended amounts of the polybutenes results in a hard, viscous composition which must be milled and extruded at correspondingly higher temperatures and pressures. Use of greater than the recommended amount of polybutene results in a composition which is too tacky and soft to handle conveniently.

By the term "polybutene" is meant synthetic hydrocarbon polymers obtained by the catalytic polymerization of normal and branched chain butenes, usually butene-1, butene-2 and isobutylene. The mixture of normal and branched chain butenes is usually obtained as a fraction from the cracking of petroleum and contains approximately 90 percent by weight of butene-1, butene-2 and isobutylene. The mixture is then polymerized to yield a copolymer having a number average molecular weight within a range of from about 300 to 3000.

The butene-1, butene-2 and isobutylene content of the polybutenes can be determined by Nuclear Magnetic Resonance Spectroscopy and is generally about 3 to 25 percent by weight butene-1, butene-2 moiety, of which about 2 to 15 percent is butene-1 moiety and about 0.5 to 12 percent is butene-2 moiety, and about 75 to 97 percent by weight polyisobutylene moiety; the percentages by weight being based on the total weight of copolymer of butene-1, butene-2 and isobutylene. Examples of typical polybutenes useful in the practice of the invention include the following commercially available material.

| Contents % by Weight | ORONITE No. 8 | ORONITE No. 32 | ORONITE No. 122 | ORONITE No. 128 |
|---|---|---|---|---|
| isobutylene | 79 | 92 | 95 | 96 |
| butene-1 | 11 | 6 | 4 | 3 |
| butene-2 | 10 | 2 | 1 | 1 |

The polyisobutylene gives the sealant composition the necessary tack and cure properties to be conveniently handled for milling and extruding. Further, in combination with the polybutenes, the polybutene copolymers contributes to the flowability of the sealant such that it can be applied to the multiple glazed unit conveniently and with little pressure. The polyisobutylene useful in the practice of this invention has a viscosity average molecular weight of about 5000 to 15,000 and is a viscous, tacky material. The polyisobutylene content of the sealant composition should be within the range of about 8 to 60, and preferably about 8 to 20 percent by weight, based on total weight of the sealant composition. Polyisobutylene contents below 8 percent by weight are not recommended because the sealant composition will have a tendency to cure too quickly thereby minimizing the sealants good handling characteristics. Polyisobutylene contents much above 20 percent by weight, and definitely above 60 percent by weight, are not recommended because the mixture will not cure sufficiently resulting in insufficient sealing properties.

By the term "polyisobutylene" is meant a homopolymer of isobutylene having a viscosity average molecular weight (Standinger) within the range of 5000 to 15,000. Polyisobutylenes are well known in the art and are available commercially under the trademarks VISTANEX and OPPANOL.

It has been found that when higher amounts of butyl rubber are used, that is, higher amounts within the ranges set forth above, the percentages of the polyisobutylene and polybutene should be adjusted so as to obtain a composition having the required softness and viscosity so that the composition can be milled and extruded at low temperatures and pressures. Accordingly, higher polybutene and lower polyisobutylene contents in the above-mentioned ranges should be used to compensate for the higher butyl contents. Also, the butyl rubber and polyisobutylene contents can be varied with one another while keeping the polybutene content constant. For example, lower butyl rubber contents within the ranges set forth above can be balanced by polyisobutylene contents in the higher portion of the ranges set forth. Further, it has been found that with regards to the polybutene, the higher the molecular weight, the more of it that is required to obtain the desired properties in the sealant composition. The lower the molecular weight of the polybutene, the less the amount which is required to provide the sealant mixture with the desired properties.

Optional ingredients can of course be added to the sealant composition and should be added to assist in getting the desired flow characteristics, weather resistance, adhesion and tackiness in the sealant composition.

It is conventional practice in working with a butyl rubber-containing composition to employ about 1 to 10 and preferably about 2.5 to 5 percent by weight based on total weight of the sealant composition of zinc oxide to aid in mixing and to increase the resistance of the sealant to deterioration upon exposure to ultraviolet radiation.

In order for the sealant composition to have a more pleasing and uniform appearance, it may contain up to about 40 percent by weight of carbon black based on total weight of the sealant composition. For use in multiple glazed units, small amounts on the order of about 1 to 20 percent by weight of carbon black based on weight of the sealant composition are usually employed. The carbon black also serves to stabilize the sealant composition with respect to polymeric degradation caused by exposure to ultraviolet light and also serves as a reinforcing agent.

To assist in milling and extrusion, a thixotropic agent such as silica pigments can be added to the sealant composition. The silica pigments should be present in a concentration of up to about 30 percent by weight, preferably about 2 to 15 percent by weight based on total weight of the composition depending upon proportion of the other constituents present in the composition. Examples of suitable silica pigment include those sold under the trademarks HI-SIL and CAB-O-SIL.

Reinforcing fillers such as zirconium orthosilicate, calcium carbonate and titanium dioxide can also be added to the sealant composition. These reinforcing fillers can be used alone or in combination with one another. The use of zirconium orthosilicate in amounts of up to 20 percent and preferably 2 to 15 percent by weight based on total weight of the sealant composition is preferred because the zirconium orthosilicate, besides reinforcing the sealant, appears to promote its adhesion to glass.

For use in glazing applications, adhesion promoting agents for glass can also be included in the sealant. Such agents are the organo alkoxysilanes such as gamma-glycidoxypropyltrimethoxy silane, gamma-aminopropyltriethoxy silane, N-bis(beta-hydroxyethyl) gamma-aminopropyltriethoxy silane and N-beta(aminoethyl)-gamma-aminopropyltrimethoxy silane.

Tackifiers may also optionally be included in the sealant composition. These ingredients serve to provide a surface wetness or tackiness to the sealant composition to insure that it will wet the surfaces to be sealed. Examples of such tackifiers include hydroxy-terminated polybutadiene resins such as those sold by Sinclair Petrochemical as POLY-BDR.

The sealant composition of the invention comes in the form of two components. The two components each contain approximately 18 to 65 percent by weight butyl rubber, 8 to 60 percent by weight polyisobutylene and 15 to 65 percent by weight polybutene; the percentages by weight being based on the total weight of the particular component. When the three rubbery ingredients are present in these concentration ranges, the other ingredients present in the components can be more easily compounded into the component. In the most preferred embodiment, the relative proportions of butyl rubber, polyisobutylene and polybutene which are present in each of the components are approximately equal to the respective relative proportions of butyl rubber, polyisobutylene and polybutene which are present in the final sealant composition. By formulating the components in this manner, one merely has to take equal portions of both components and extrude them together to form the final sealant composition. This minimizes operator error in formulating the sealant.

A quinone dioxime is combined with one of the components and an oxidizing agent such as lead oxide is combined with the other components. The quinone dioxime is preferably para-quinone dioxime or an ester thereof, such as the dibenzoate ester. Since neither the quinone dioxime or its dibenzoate ester is a cross linking agent, both must first be oxidized to dinitrobenzene to become effective, e.g.,

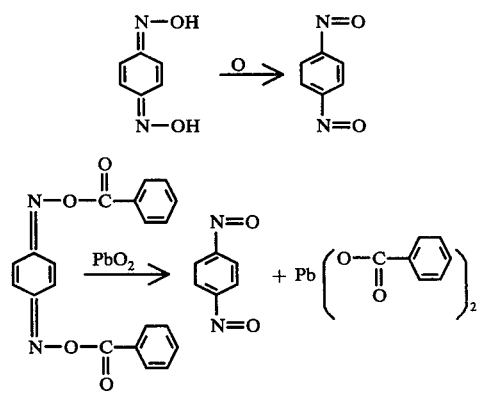

As indicated above, oxidation has been accomplished with $PbO_2$. Other suitable oxidizing agents include benzothiazyldisulfide, manganese dioxide, lead tetraoxide, halogen donors such as chlorotoluene sulfonamide, dichlorodimethyl hydantoin. As has been mentioned, the dinitro aromatics appear to be the active crosslinking agents and the nitro groups could be placed meta or para, but not ortho to each other, and alkyl groups in other positions of the ring do not interfere with the curing reaction. The amount of active dinitro curing agent employed usually ranges from about 0.2 to 2 percent by weight based on weight of the butyl rubber.

To achieve the required concentration of dinitro curing agent, the quinone dioxime should be present in amounts of 0.2 to 2 percent by weight and the oxidizing agent should be present in amounts of 0.4 to 5 percent by weight; the percentages by weight being based on the weight of butyl rubber present in the two components.

The optional ingredients can be included in one or both of the components, preferably in both. By putting partial loadings of the optional ingredients in both components, it is somewhat easier to distribute them evenly throughout the rubbery mixture. The individual components can be compounded on a two-roll mill using standard milling procedures. Usually all of the butyl rubber and about ½ of the final amount of polyisobutylene are initially added to the mill and mixed together until the two components form a homogeneous mixture. The remainder of the polyisobutylene is then added followed by incremental additions of polybutene and the optional ingredients such as carbon black and silica pigment. These latter incremental additions should be partial with only about 1/10 to ½ of the ingredient being added at any one time. Further additions should be made only after the prior added ingredient has been evenly dispersed throughout the milling mixture. Milling is conducted at a fairly low temperature on the order of 200° F.

The individual components when properly formulated and milled have a fairly low viscosity or consistency which enables them to be extruded together at relatively low pressures and temperatures. Accordingly, the individual components should have consistencies of about 100 to 300, preferably 100 to 200 metergrams as determined with an 80 gram sample in a Brabender Plastograph using sigma-shaped blades at 250° F.

In mixing and extruding the final sealant composition, the two components are cut into strips and added to an extruder which blends the components together and brings the oxidizing agent into contact with the quinone dioxime to produce the dinitrobenzene curing agent. After extrusion the sealant slowly cures at room temperature to form a firm tacky resilient seal.

Due to the relatively low consistency of the individual components, the two components can be extruded together at relatively low temperatures, i.e., extrusion temperatures on the order of 120 to 180° F. with relatively short barrel extruder, i.e., extruder having length-to-diameter ratios of about 8 to 1 or less. Low temperature extrusion insures that there will be essentially no or only minimal curing of the sealant composition in the extruder. Since the extruded sealant composition is initially essentially uncured and of relatively low viscosity or consistency, it readily cold flows and can be applied to double glazed units without the need of high pressure equipment such as clamps, rigid spacers and the like. The sealant composition can be extruded in bead or ribbon form directly to the edge of a multiple glazed unit or alternately can be extruded onto a strip of release paper and the sealant applied by hand or by machine to the double glazed unit with the release paper being subsequently removed.

The sealant composition after it is initially extruded and is essentially uncured should be tacky of relatively low viscosity or consistency. The low consistency is necessary so that the sealant will cold flow at room temperature and thus be easily spreadable across the edges of a multiple glazed unit. The tackiness is necessary so that the sealant will wet the surfaces it contacts forming a hermetic seal. Accordingly, the sealant after it is initially extruded should have the following physical properties:

Consistency: 100 to 300, preferably 100 to 200 metergrams
Cold flow: final thickness less than 5 mils
Tack: 80 to 100, preferably 90 to 110 grams/square inch The consistency was determined on an 80 gram sample in a Brabender Plastograph at 250° F. using sigma-shaped blades. The cold flow was determined by placing a 0.06 inch diameter bead between polished aluminum and plate glass and subjecting it to a pressure of 35 pounds per square inch at 140° F. for 48 hours and then measuring the final thickness of the sealant. The tack values were determined by projecting a glass rod of ¼ inch diameter against the sample at a force of 10 grams, waiting one minute so as to insure surface contact and them measuring the force required to pull the rod away from the sample at a rate of 20 inches per minute.

When the sealant composition of the invention is fully cured, it is a firm strong tacky resilient material which strongly adheres to both glass and aluminum and provides a long-lasting hermetic seal in a multiple glazed unit. Accordingly, the fully cured sealant has the following physical properties:

Initial Shore A-2 durometer hardness of about 10 to 15
Tensile strength of about 65 to 100 pounds per square inch
Ultimate elongation of about 700 to 1000 percent
Tensile Product: 4.35 to 10.00
180° Peel Strength: 10 to 25 pounds per lineal inch
Tack: 50 to 100 grams per square inch
Consistency: 500 to 700 metergrams at 250° F. and 15 minutes
Cold flow: final thickness greater than 30 mils The hardness is an initial value as obtained on a 1/4 inch thick strip according to A.S.T.M. D-670-49T. The tensile strength is determined at the ultimate elongation when the sample ruptured according to A.S.T.M. D-412-66. The tensile product is the product of the ultimate elongation and the tensile strength at the ultimate elongation. The 180° peel strength is determined according to A.S.T.M. D-903-49T using a flexible aluminum foil adhered through the fully cured sealant to a glass sheet. The consistency was determined as generally described above with the exception that the consistency value was determined at 15 minutes. At longer periods of time, the sealant works out from between the blades of the plastograph. The tack and cold flow values are determined as generally described above.

EXAMPLES

EXAMPLE I

Description of the Preferred Embodiment

A sealing composition comprising the following two components was prepared as follows:

|  | Component A (% by Weight Based on Total Weight of Component A) | Component B (% by Weight Based on Total Weight of Component B) |
| --- | --- | --- |
| Butyl rubber | 19.2 | 19.2 |
| Polyisobutylene | 16 | 16 |
| Polybutene | 26.1 | 26.7 |
| Carbon black | 14.1 | — |
| Silica pigment (HI-SIL 233) | 8.8 | 8.8 |
| Zinc oxide | — | 8.8 |
| Silica pigment (TK 800) | 2.1 | 2.1 |
| Zirconium orthosilicate | 8.8 | 14.4 |
| Lead dioxide | 2.8 | — |
| Paraquinone dioxime | — | 1.4 |

| | Component A (% by Weight Based on Total Weight of Component A) | Component B (% by Weight Based on Total Weight of Component B) |
|---|---|---|
| Gamma-glycidoxypropyl-trimethoxy silane | 0.35 | 0.35 |
| Butadiene polymer with terminal hydroxyl groups | 1.7 | 1.8 |

The butyl rubber has a Mooney value of 41 to 49, a mole percent unsaturation of 1.2 and a Viscosity Average Molecular Weight of 350,000. The butyl rubber is commercially available from Exxon Chemical Company under the trade name Butyl 165 CC.

The polyisobutylene is commercially available from Exxon Chemical Company under the trademark VISTANEX LM, MS. It has a Viscosity Average Molecular Weight of about 10,000 to 15,000.

The polybutene is commercially available from the California Chemical Company under the trademark ORONITE 32.

The carbon black is commercially available from Columbia Carbon Company under the trademark STA-TEX G.

The HI-SI1 silica pigment is commercially available from PPG Industries, Inc.

The zinc oxide is XX4 grade and manufactured by the New Jersey Zinc Company.

The TK 800 silica pigment is commercially available from Degussa Inc.

The zirconium orthosilicate is solid commercially by the National Lead Company under the trademark SUPERPAX.

The lead dioxide is technical grade manufactured by the J. T. Baker Chemical Company.

The paraquinone dioxime is commercially available from the Naugatuck Chemical Division of United States Rubber Company under the trademark GMF.

The gamma-glycidoxypropyltrimethoxy silane is sold commercially by Dow Corning Company under the trade name Z-6040.

The hydroxy-terminated polybutadiene was sold commercially by Sinclair Petrochemicals Inc. under the trade name Poly-BDR-45M.

All of the ingredients were thoroughly milled to a homogeneous mix on a rubber compounding mill as follows:

| Time | Ingredient of Component A Added |
|---|---|
| 0:00 | 1/2 of the polyisobutylene and all of the butyl rubber |
| 0:10 | remainder of the polyisobutylene |
| 0:15 | 1/3 carbon black |
| 0:20 | 1/3 carbon black |
| 0:25 | 1/3 carbon black |
| 0:30 | 1/10 polybutene |
| 0:45 | 1/2 silica pigment (HI-SIL 233) |
| 0:50 | 1/2 silica pigment (HI-SIL 233) |
| 0:55 | 1/2 zirconium orthosilicate |
| 0:60 | 1/2 zirconium orthosilicate |
| 1:10 | 1/10 polybutene |
| 1:20 | all of the silica pigment (TK 800) |
| 1:25 | 1/10 polybutene |
| 1:40 | 1/10 polybutene |
| 1:50 | 1/10 polybutene |
| 1:55 | PbO$_2$ |
| 2:00 | 1/10 polybutene |
| 2:10 | 1/10 polybutene |
| 2:20 | 1/10 polybutene |
| 2:30 | 1/10 polybutene |
| 2:40 | 1/10 polybutene |
| 2:45 | 1/10 polybutene |
| 2:50 | all of hydroxy-terminated polybutadiene resin |
| 3:00 | all of the gamma-glycidoxypropyltrimethoxy silane |

Mixing is conducted at a temperature of about 200° F. and the time of mixing is given only as an indication that a good dispersion of each ingredient is needed before proceeding to the next material. In an analogous manner, Component B was formulated.

The two well-mixed and homogeneous Components A and B were cut into approximately equal strips and then fed into a 3½ inch rubber extruder having a length-to-diameter ratio of 4 to 1 where the individual components were blended together. The material was extruded into ribbon form directly onto a release paper from which point it was easily applied by hand to multiple glazed units. The sealant formed a hermetic seal and had excellent weathering properties as determined by accelerated testing. The physical properties of the sealant material immediately after it was extruded were as follows:

Tack: 100 grams/inch$^2$
Initial Shore A-2 Durometer Hardness: 7
Consistency: 150 metergrams determined at 250° F.
Cold flow: final thickness 5 mils The material was then permitted to cure for two weeks at room temperature after which time it was completely cured. After curing, the sealant had the following physical properties:

Tensile Strength: 82 pounds/inch$^2$
Percent Elongation at Break: 900 percent
Tensile Product: 7.38
Tack: 76 grams/inch$^2$
Initial Shore A-2 Durometer Hardness: 12
Consistency: 610 l metergrams determined at 250° F. and at 15 minutes in the Brabender Plastograph
Cold flow: final thickness of 40 mils

EXAMPLE II

For the purposes of comparison, a sealant composition such as disclosed in Example I of the Kunkle patent, U.S. Pat. No. 2,974,377, was prepared by combining the following ingredients:

| Ingredient | Percent by Weight |
|---|---|
| Polyisobutylene (VISTANEX LM, MS, Viscosity Average Molecular Weight 10,000) | 61.2 |
| Butyl rubber (GR-1 Viscosity Average Molecular Weight 60,000) | 30.6 |
| Zinc oxide | 3.1 |
| Para-dinitrobenzene | 0.6 |
| Carbon black | 4.5 |

All of the ingredients, with the exception of the para-dinitrobenzene, were thoroughly milled to a homogeneous mix on a rubber compounding mill. When a homogeneous mix was obtained, the temperature of the mix was lowered to about 200° F. and the para-dinitrobenzene added. The milling was then conducted at 250° F. for 15 minutes. The vulcanization action proceeded readily during the milling. The compound could be extruded only at higher temperatures and pressures than that needed for extruding the unvulcanized sealant of the present invention. Extrusion could be done at temperatures of 280° F. in an extruder designed for extruding rubber stock. The material had the following physical properties: immediately after extrusion Tensile strength at 200 percent elongation: 11 (sample did not break)
Ultimate elongation: > 1100 percent, sample did not break at 1100 percent elongation. Tensile load at this elongation about 1 pound per square inch
Initial Shore A-2 Durometer Hardness: 12
Tack: 80 grams/inch$^2$
Consistency: 900 metergrams determined at 15 minutes in the Plastograph at 250° F.

From the above two examples it can be seen that the sealant composition of the invention offers numerous advantages over the sealant composition of the prior art as exemplified by the Kunkle patent. The sealant of the present invention has a low viscosity or consistency allowing it to be milled and extruded at low temperatures without activating the curing agent. The uncured material cold flows and can be applied to a multiple glazed unit without the need for high pressure clamps. The sealant composition of the invention fully cures at room temperature and forms a firm, resilient seal having physical properties comparable to the aforementioned Kunkle sealant. The sealant of the present invention adheres strongly to both glass and aluminum and provides a long-lasting hermetic seal in a multiple-glazed unit.

I claim:
1. A room temperature vulcanizable sealant comprising an essentially solvent-free admixture of two rubbery components said admixture having an initial consistency of 100 to 300 metergrams and comprising:
 a. as a first component:
  i. 18 to 35 percent by weight butyl rubber;
  ii. 8 to 20 percent by weight polyisobutylene;
  iii. 15 to 35 percent by weight polybutene;
  iv. 0.2 to 2 percent by weight quinone dioxime; and
  v. at least 3 percent by weight pigment or filler or a combination of pigment and filler;
 b. as a second component:
  i. 18 to 35 percent by weight butyl rubber;
  ii. 8 to 20 percent by weight polyisobutylene;
  iii. 15 to 35 percent by weight polybutene;
  iv. 0.4 to 5 percent by weight oxidizing agent; and
  v. at least 3 percent by weight pigment or filler or a combination of pigment and filler;
said polybutene being a copolymer of which 3 to 25 percent by weight is a butene-1, butene-2 moiety and 25 to 97 percent by weight is an isobutylene moiety and said admixture containing at least 3 percent by total weight of pigment or filler or a combination of pigment and filler.
2. The sealant according to claim 1 wherein each component comprises:
 i. 18 to 35 percent by weight butyl rubber,
 ii. 8 to 20 percent by weight polyisobutylene,
 iii. 15 to 35 percent by weight polybutene, and
 iv. up to 40 percent of a pigment or filler or a combination of pigment and filler.
3. The sealant of claim 2 which contains up to 20 percent by weight of zirconium orthosilicate.
4. The sealant of claim 1 in which the oxidizing agent is lead oxide.
5. The sealant of claim 1 in which the quinone dioxime is paraquinone dioxime.
6. The sealant of claim 1 which contains up to 40 percent by weight carbon black.
7. The sealant of claim 1 which contains up to 30 percent by weight silica pigment.
8. The sealant of claim 1 which contains 1 to 10 percent by weight zinc oxide.
9. The sealant of claim 1 which further contains an organo silane.
10. A method of making a room temperature vulcanizable sealant comprising the steps of:
 a. forming a first rubbery component which is essentially solvent-free and which comprises:
  i. 18 to 35 percent by weight butyl rubber;
  ii. 8 to 20 percent by weight polyisobutylene;
  iii. 15 to 35 percent by weight polybutene;
  iv. 0.2 to 2 percent by weight quinone dioxime; and
  v. at least 3 percent by weight pigment or filler or a combination of pigment and filler;
 b. forming a second rubbery component which is essentially solvent-free and which comprises:
  i. 18 to 35 percent by weight butyl rubber;
  ii. 8 to 20 percent by weight polyisobutylene;
  iii. 15 to 35 percent by weight polybutene;
  iv. 0.4 to 5 percent by weight oxidizing agent; and
  v. at least 3 percent by weight pigment or filler or a combination of pigment and filler; and
 c. extruding the compositions together at a temperature between about 120° F. and about 180° F. to form an initially uncured cold flowable mastic in bead or ribbon form which contains at least 3 percent by weight pigment or filler or a combination of pigment and filler and which has an initial consistency of 100 to 300 metergrams; said polybutene being a copolymer of about 3 to 25 percent by weight of a butene-1, butene-2 moiety and about 75 to 97 percent by weight of an isobutylene moiety.
11. The method according to claim 10 wherein both the first and second compositions contain:
 i. 18 to 35 percent by weight butyl rubber,
 ii. 8 to 20 percent by weight polyisobutylene,
 iii. 15 to 35 percent by weight polybutene, and
 iv. up to 40 percent by weight of a pigment or filler or combination of pigment and filler.
12. The method as set forth in claim 11 in which the sealant contains up to 20 percent by weight of zirconium orthosilicate.
13. The method as set forth in claim 10 in which the oxidizing agent is lead oxide.
14. The method as set forth in claim 10 in which the quinone dioxime is paraquinone dioxime.
15. The method set forth in claim 10 in which the sealant contains up to 40 percent by weight carbon black.
16. The method as set forth in claim 10 in which the sealant contains up to 30 percent by weight silica pigment.

17. The method as set forth in claim 10 in which the sealant contains 1 to 10 percent by weight zinc oxide.

18. A room temperature vulcanizable sealant composition suitable for hermetically sealing multiple glazed window units comprising essentially:
  18 to 35 percent by weight butyl rubber,
  8 to 20 percent by weight polyisobutylene,
  15 to 35 percent by weight polybutene,
  0 to 40 percent by weight carbon black,
  0 to 30 percent by weight silica pigment,
  0 to 20 percent by weight zirconium orthosilicate,
  1.0 to 10 percent by weight zinc oxide,
the above percentages by weight based on the total weight of the sealant composition and
  0.4 to 3.5 percent by weight of an oxidizing agent and
  0.2 to 6 percent by weight of a quinone dioxime,
the above percentages by weight based on the weight of butyl rubber, said sealant composition being essentially solvent-free and having initially a consistency of 100 to 300 metergrams; said polybutene being a copolymer of about 3 to 25 percent by weight of a butene-1, butene-2 moiety and about 75 to 97 percent by weight of an isobutylene moiety.

19. The sealant of claim 18 which contains up to 20 percent by weight zirconium orthosilicate.

20. The sealant of claim 18 which contains up to 40 percent by weight carbon black.

21. The sealant of claim 18 which contains up to 30 percent by weight silica pigment.

22. The sealant of claim 18 which further contains an organo silane.

23. A method for sealing a structure which comprises the steps of:
  a. forming a room temperature vulcanizable sealant substantially free of hydrocarbon solvent comprising:
    i. 18 to 35 percent by weight butyl rubber,
    ii. 8 to 20 percent by weight polyisobutylene,
    iii. 15 to 35 percent by weight polybutene,
    iv. 0 to 40 percent by weight carbon black,
    v. 0 to 30 percent by weight silica pigment,
    vi. 0 to 20 percent by weight zirconium orthosilicate,
    vii. 1 to 10 percent by weight zinc oxide,
  the above percentages based on the total weight of the sealant composition and
    viii. 0.2 to 6 percent by weight of a quinone dioxime, and
    ix. 0.4 to 3.5 percent by weight of an oxidizing agent
  the above percentages based on the weight of butyl rubber, said sealant composition being initially essentially uncured and having an initial consistency of 100 to 300 metergrams; said polybutene being a copolymer of about 3 to 25 percent by weight of a butene-1, butene-2 moiety and about 75 to 97 percent by weight of an isobutylene moiety;
  b. applying said uncured sealant to the structure to be sealed; and
  c. allowing said sealant to cure in situ at ambient temperatures.

24. The method according to claim 23 wherein the sealant is formed by extruding together at a temperature between about 120° F. and about 180° F:
  a. a first rubbery component comprising:
    i. 18 to 35 percent by weight butyl rubber;
    ii. 8 to 20 percent by weight polyisobutylene;
    iii. 15 to 25 percent by weight polybutene; and
    iv. 0.2 to 2 percent by weight of a quinone dioxime; and
  b. a second rubbery component comprising:
    i. 18 to 35 percent by weight butyl rubber;
    ii. 8 to 20 percent by weight polyisobutylene;
    iii. 15 to 35 percent by weight polybutene; and
    iv. 0.4 to 5 percent by weight of an oxidizing agent.

* * * * *